(12) United States Patent
Hassan et al.

(10) Patent No.: US 7,523,112 B2
(45) Date of Patent: Apr. 21, 2009

(54) SYSTEM AND METHOD FOR SEARCHING A REMOTE DATABASE

(75) Inventors: Ahmed E. Hassan, Waterloo (CA); Denny K. Chiu, Kitchener (CA)

(73) Assignee: Research In Motion Limited, Waterloo (CA)

( * ) Notice: Subject to any disclaimer, the term of this patent is extended or adjusted under 35 U.S.C. 154(b) by 464 days.

(21) Appl. No.: 10/782,691

(22) Filed: Feb. 19, 2004

(65) Prior Publication Data

US 2005/0187971 A1    Aug. 25, 2005

(51) Int. Cl.
*G06F 17/30* (2006.01)
*G06F 7/00* (2006.01)

(52) U.S. Cl. .............................. 707/10; 707/3
(58) Field of Classification Search .................. 707/10, 707/3
See application file for complete search history.

(56) References Cited

U.S. PATENT DOCUMENTS

| | | | | |
|---|---|---|---|---|
| 5,701,461 A * | 12/1997 | Dalal et al. ...................... 707/4 |
| 5,857,201 A * | 1/1999 | Wright et al. ............. 707/104.1 |
| 5,995,597 A | 11/1999 | Woltz et al. ............... 379/93.24 |
| 6,049,796 A | 4/2000 | Siitonen et al. ................. 707/3 |
| 6,101,531 A | 8/2000 | Eggleston et al. ........... 709/206 |
| 6,216,165 B1 | 4/2001 | Woltz et al. .................. 709/232 |
| 6,610,105 B1 | 8/2003 | Martin, Jr. et al. .......... 715/513 |
| 6,643,650 B1 | 11/2003 | Slaughter et al. .............. 707/10 |
| 6,647,409 B1 | 11/2003 | Sherman et al. ............. 709/203 |
| 6,898,591 B1 * | 5/2005 | Moon et al. ...................... 707/3 |
| 2002/0116457 A1 * | 8/2002 | Eshleman et al. ........... 709/203 |
| 2002/0137540 A1 * | 9/2002 | Yu .............................. 455/556 |
| 2003/0069874 A1 * | 4/2003 | Hertzog et al. ................. 707/1 |
| 2003/0097358 A1 * | 5/2003 | Mendez ......................... 707/3 |
| 2003/0110190 A1 * | 6/2003 | Achiwa et al. .............. 707/203 |
| 2003/0200282 A1 * | 10/2003 | Arnold et al. ............... 709/219 |
| 2004/0037266 A1 * | 2/2004 | Roberts et al. .............. 370/352 |

FOREIGN PATENT DOCUMENTS

| | | |
|---|---|---|
| EP | 1 071 029 A2 | 1/2001 |
| EP | 1 107 638 A1 | 6/2001 |
| WO | WO 02/31691 A2 | 4/2002 |

* cited by examiner

*Primary Examiner*—Kuen S Lu
(74) *Attorney, Agent, or Firm*—Jones Day; Krishna K. Pathiyal; Robert C. Liang (57) ABSTRACT

In accordance with the teachings described herein, systems and methods are provided for searching a remote database. A server may be used to communicate with a mobile device over a wireless network. The mobile device may include a local application database for storing data items for one or more software applications. The server may include a server application database for storing copies of data items that are transmitted to the mobile device. A local search module on the mobile device may be used to identify one or more data items in the local application database that match a set of search parameters. If the one or more data items cannot be identified in the local application database, then a remote search module on the server may be used to identify a copy of the one or more data items in the server application database that match the set of search parameters.

11 Claims, 7 Drawing Sheets

SYSTEM AND METHOD FOR SEARCHING A REMOTE DATABASE

FIELD

The technology described in this patent document relates generally to the fields of wireless communications and data storage. In particular, a system and method are described for searching a remote database.

BACKGROUND

Systems for synchronizing data between a mobile device and a remote server are known in this field. However, a typical mobile device has limited memory resources for storing application data. It may not, therefore, always be feasible to maintain a complete set of application data on both the mobile device and the remote server.

SUMMARY

In accordance with the teachings described herein, systems and methods are provided for searching a remote database. A server may be used to communicate with a mobile device over a wireless network. The mobile device may include a local application database for storing data items for one or more software applications. The server may include a server application database for storing copies of data items that are transmitted to the mobile device. A local search module on the mobile device may be used to identify one or more data items in the local application database that match a set of search parameters. If the one or more data items cannot be identified in the local application database, then a remote search module on the server may be used to identify a copy of the one or more data items in the server application database that match the set of search parameters.

DETAILED DESCRIPTION

Figure 1:
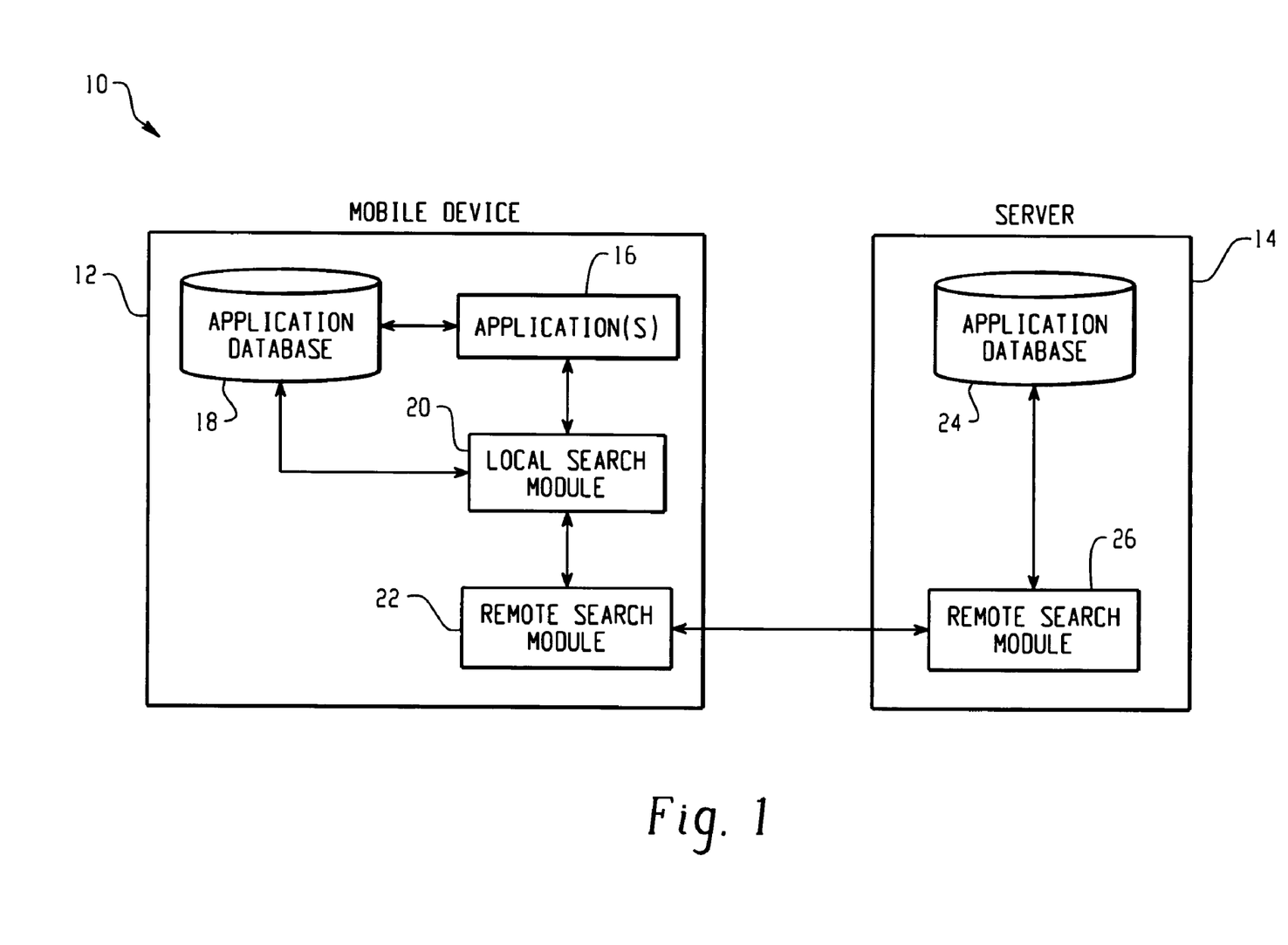
FIG. 1 is a block diagram illustrating an example system for searching a remote database.

With reference now to the drawing figures, FIG. 1 is a block diagram illustrating an example system 10 for searching a remote database 24. The system 10 includes a mobile device 12 that is in communication with a server 14. The mobile device 12 includes one or more software applications 16, an application database 18, a local search software module 20, and a remote search software module 22. The server 14 includes an application database 24 and a remote search software module 26.

The mobile device 12 is preferably a wireless communication device (e.g., a cellular telephone, a two-way pager, a wireless-enabled PDA, a laptop computer, etc.) that is configured to communicate with the server 14 over a wireless network. One example mobile device 12 is described below with reference to FIG. 9. The server 14 is preferably a network server that is operable to communicate with one or more local and/or wide area networks. An example system for transmitting information between the mobile device 12 and the server 14 is described below with reference to FIG. 8.

The application database 18 on the mobile device 12, referred to herein as the local application database 12, is used to store data for software applications 16 executed by the mobile device 12, such as an electronic messaging application, a document processing application, a calendar application, an address book application, a web browser application, and/or other software applications. Copies of the data stored in the local application database 18, along with additional related data, may also be stored in the application database 24 associated with the server 14, referred to herein as the server application database 24. For example, electronic messages or other data may be stored in the server application database 24 and then forwarded to the mobile device 12, as described below with reference to FIGS. 2 and 8. Alternatively, the data in the local application database 18 may be synchronized with the data in the server application database 24 using known database synchronization techniques.

The local search module 20 may be a software module executed by a processing subsystem in the mobile device 12 that is operable to identify data stored in the local application database 18. The local search module 20 identifies data in the local application database by matching the stored data with search parameters entered by a device user. For example, an electronic message stored in the local application database may be located by entering search parameters related to the electronic message, such as the sender information, date received, or other relevant electronic messaging parameters. The local search module 20 may then use these parameters to identify any electronic messages stored in the local application database 18 that include matching electronic messaging parameters.

The remote search module 22 on the mobile device 12 may be a software module executed by a processing subsystem in the mobile device 12 that is operable to communicate with the remote search module 26 on the server 14 to identify data stored in the server application database 24. The remote search module 22 may, for example, generate search request messages that include search parameters to be used by the remote search module 26 in the server 14, and receive search result messages from the server 14 identifying data located in the server application database 14. The remote search module 22 may also instruct the remote search module 26 on the server 14 to transfer data to the mobile device 12 that was identified from the search parameters.

The remote search module 26 on the server 14 may be a software module executed by a processing sub-system in the server 14 that is operable to communicate with the remote search module 22 on the mobile device 12 and to identify data items in the server application database 24 by matching the stored data with search parameters received from the mobile device 12. The remote search module 26 may also be operable to generate a search result message that identifies the results of a server application database search requested by the mobile device 12, and to transfer identified data items to the mobile device 12 upon receiving instructions by the remote search module 22 on the mobile device 12.

In operation, search parameters 20 may first be entered into the local search module 20 to locate a data item that may be stored in the local application database 18. However, because of the memory constraints in a typical mobile device 12, certain data items for use with the software applications 16 may be stored only in the server application database 24. For example, in the case of an electronic messaging software application, a device user may elect not to store or to delete certain received electronic messages. In another example, the mobile device 12 may include memory management software that applies memory retention criteria to free additional memory by automatically deleting older or less frequently used data from the application database. Thus, if the data item is not located in the local application database 18 by the local search module 20, then a server application database search is initiated by the remote search module 22.

In order to initiate a server application database search, the remote search module 22 on the mobile device 12 may generate a search request message containing the search parameters and transmit the message to the remote search module 26 on the server 14. The remote search module 26 may then use the search parameters to identify matching data items stored on the server application database 24. If matching data items are identified, then the remote search module 26 may generate a search result message that includes information identifying the results of the server application database search, and transmit the search result message to the mobile device 12. For example, the search result message may include identifying information for each matching data item, such as a title, a date, sender information, a segment of the body text, and/or other identifying information. In the case of electronic messaging data items, for instance, the search result message may include information identifying the sender (i.e., the FROM field) of each matching message, the date each matching message was received and a portion of the message text.

The information in the search result message may be presented to the device user by the remote search module 22 on the mobile device 12. To access one or more data items identified in the search result message, a data item request may be input to or generated by the remote search module 22 on the mobile device 12. The data item request may then be transmitted to the remote search module 26 on the server 14; instructing the remote search module 26 to transfer the requested data item(s) from the server application database 24 to the mobile device 12 for storage in the local application database 18.

Figure 2:
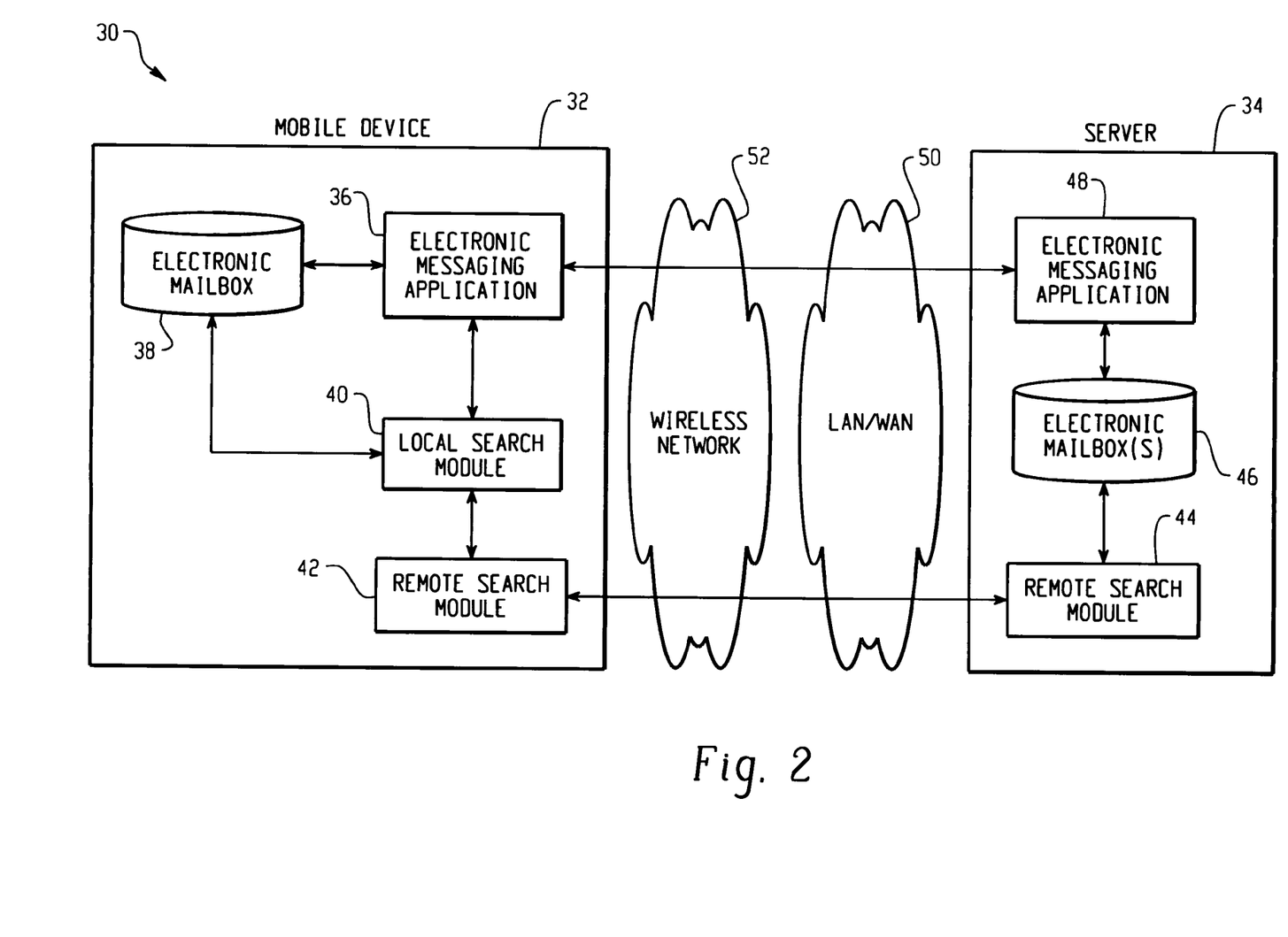
FIG. 2 is a block diagram illustrating an example application of the system of FIG. 1 with a wireless electronic messaging system.

FIG. 2 is a block diagram 30 illustrating an example application of the system 10 of FIG. 1 with a wireless electronic messaging system. In this example 30, the local application database 38 on the mobile device 32 includes an electronic mailbox for storing electronic messaging data (e.g., email) for an electronic messaging application 36 executing on the device 32. The server application database 46 includes a corresponding electronic mailbox 46 for storing copies of electronic messages sent to the mobile device 32. The server 48 may also include a server-based electronic messaging software application 48, such as a corporate mail server. The mobile device 32 and server 34 may communicate over one or more wireless and/or land-based computer networks 52, 50. An example of one such electronic messaging system is described below with reference to FIG. 8.

In operation, electronic messages received by the server-based electronic mail software application 48 may be stored to an electronic mailbox in the server application database 46 and forwarded over the networks 50, 52 to the electronic messaging application 36 on the mobile device 36. A message received by the electronic messaging application 36 on the mobile device 32 may be stored to the electronic mailbox 38 in the local application database 38, or may be deleted at the option of the device user. In addition, if the local application database 38 does not have enough free memory to store a newly received electronic message, then memory management software on the mobile device 32 may delete older or less-frequently-used data items from the local application database 38 to free the needed memory. Thus, the electronic mailbox 38 on the mobile device 32 may not include all of the electronic messages stored in the corresponding electronic mailbox 46 at the server 34. In order to retrieve a stored message, search parameters may be input to the local search module 40 to locate the message in the electronic mailbox 38 on the mobile device 32. If the message is not located in the local application database, then a remote search may be performed, as described above, to locate the message in the corresponding electronic mailbox 46 on the server 34.

Figure 3:
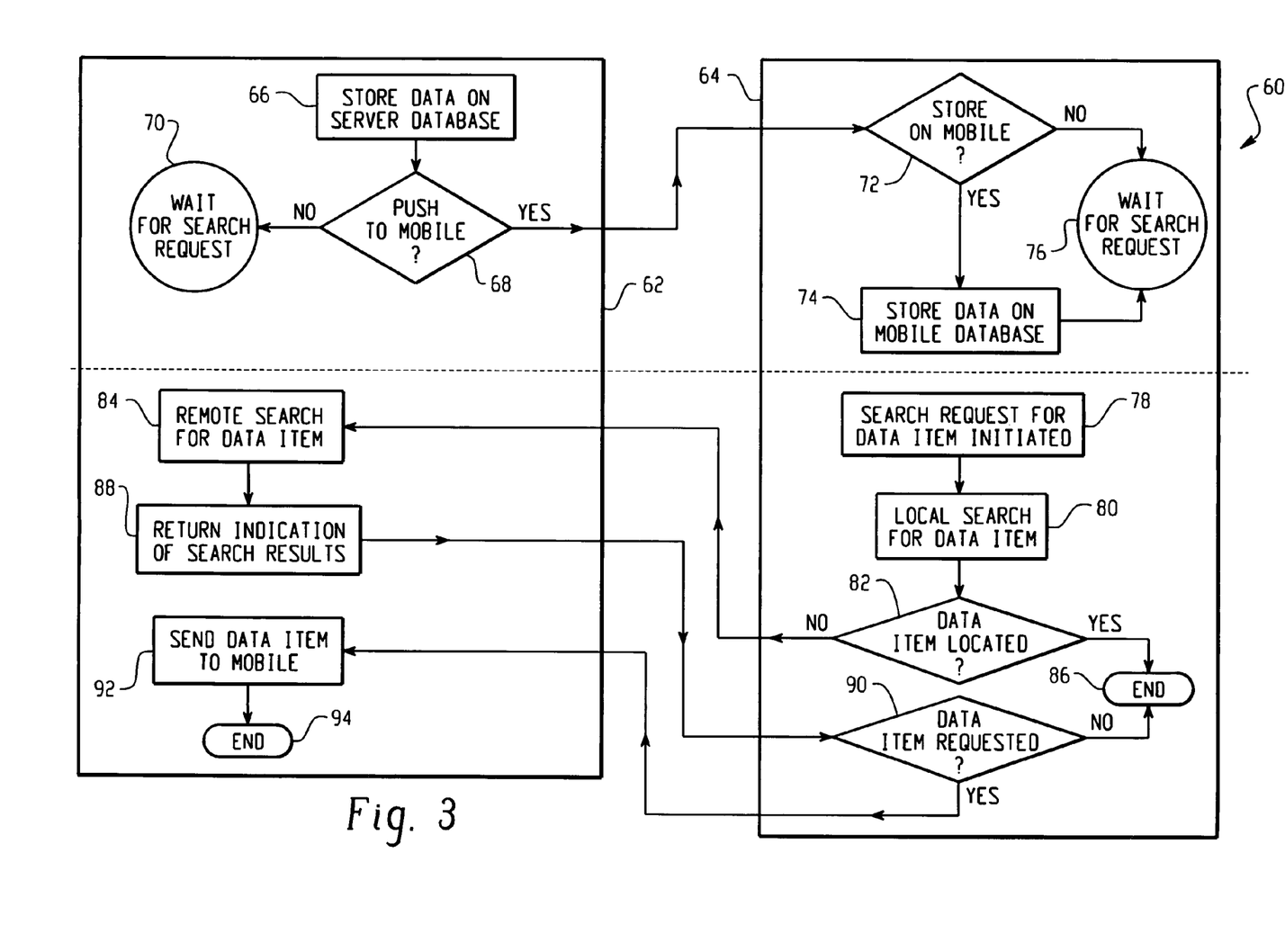
FIG. 3 includes flow diagrams to illustrate an example method for searching a remote database.

FIG. 3 includes flow diagrams to illustrate an example method for searching a remote database. The method steps illustrated within block 62 may, for example, be performed by a server. The method steps illustrated within block 64 may, for example, be performed by a mobile device.

The method begins at step 66 when a data item is stored on a server application database. At decision step 68, the method determines whether to send a copy of the data item to an associated mobile device. If a copy of the data item is not transmitted to the mobile device, then the method proceeds to step 70 and waits until a search request is initiated. If a copy of the data is transmitted to the mobile device, however, then the method proceeds to step 72.

At step 72, the method determines whether to store the data item in a local application database on the mobile device. This decision 72 may, for example, be dependent upon input from a mobile device user. If the data item is to be stored in the local application database, then the data item is stored at step 74 and the method proceeds to step 76. Else, if the data item is not stored in the local application database, then the method proceeds from step 72 to step 76. At step 76, the method waits until a search request is initiated.

The method continues at step 78 when a search request for a data item is initiated at the mobile device. In step 80, a search for the requested data item is performed in the local application database. If the data item is located in the local application database, then the method ends at step 86. Else, if the data item is not located in the local application database, then a search for the requested data item is performed in the server application database at step 84. At step 88, a search results message is generated that identifies the results of the server application database search and the search results message is sent to the mobile device. The search results message may, for example, include information identifying one or more data items that match a set of search parameters, or may indicate that no matching data items were located.

One or more data items stored in the server application database and identified in the search results message may be requested at step 90. If no data items from the server application database are requested at step 90, then the method ends at step 86. Else, if one or more data items are requested, then the requested data items are sent from the server application database to the mobile device at step 92 and the method ends at step 94.

Figure 4:
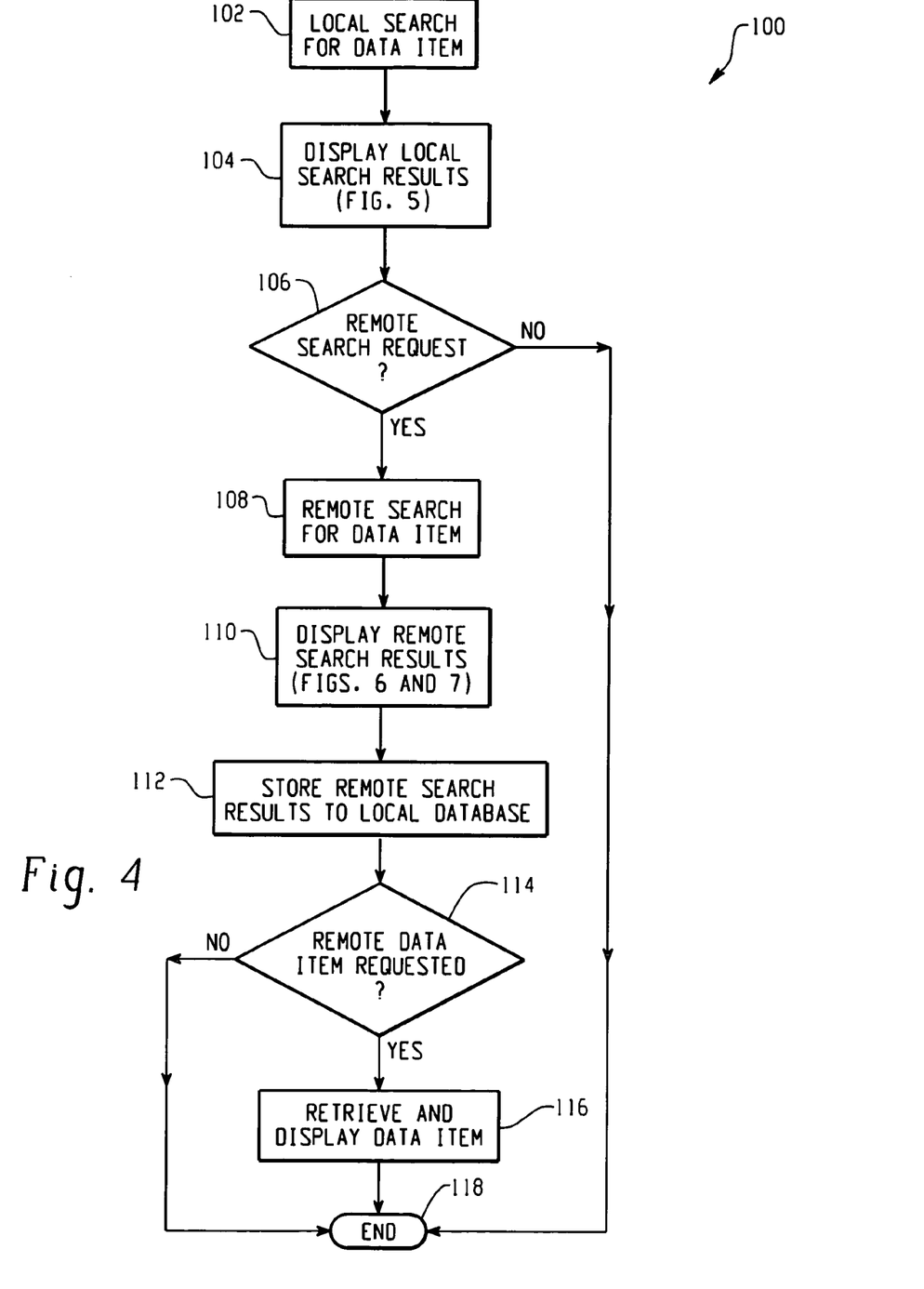
FIG. 4 is a flow diagram illustrating an example method for searching a remote database and displaying the search results on a mobile device.

FIG. 4 is a flow diagram illustrating an example method 100 for searching a remote database and displaying the search results on a mobile device. At step 102, a search for a data item is performed in the local application database. The local database search may, for example, be initiated from user interface software that may be executed from within one or more device applications. For instance, a user interface for inputting search parameters to identify stored electronic messages may be accessed from within an electronic messaging software application. At step 104, the results of the local database search are displayed on the mobile device.

Figure 5:
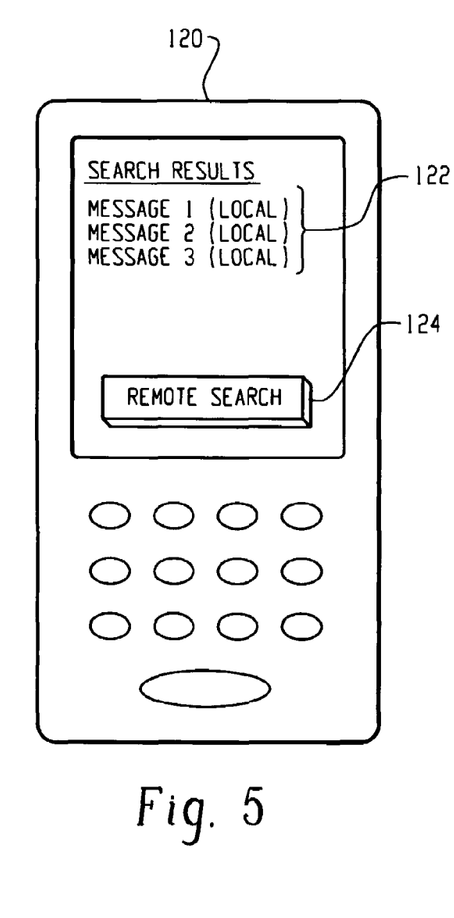
FIG. 5 shows an example user interface for displaying the results of a local database search.

FIG. 5 shows an example user interface 120 for displaying the results of a local database search. The identified data items 122 (e.g., electronic messages) from the local application database that match the search parameters are listed on the display. The list of identified data items 122 may include information to identify the contents of the data item, for example a sender name, a date, a subject line, and/or other identifying information. The listed data items 122 may include an indication that the data items 122 were identified from within the local application database. For example, listed data items identified from the local application database may be distinguished from data items identified from a remote database by the font of the listed items 122 (e.g., italicized/non-italicized, font type, etc.), the color of the listed items 122, or by some other distinguishing characteristic(s). In addition, the user interface 120 may include an input mechanism, such as a graphical icon 124, for instructing the mobile device to perform a remote database search.

With reference again to FIG. 4, the method determines whether to perform a remote database search at decision step 106. This method step 106 may, for example, be performed using input from a device user as illustrated in FIG. 5, or may be automatically performed based on the results of the local database search. In any case, if a remote database search is to be performed, then the method proceeds to step 108. Else, if no remote database search is initiated, then the method 100 ends at step 118.

Figure 6:
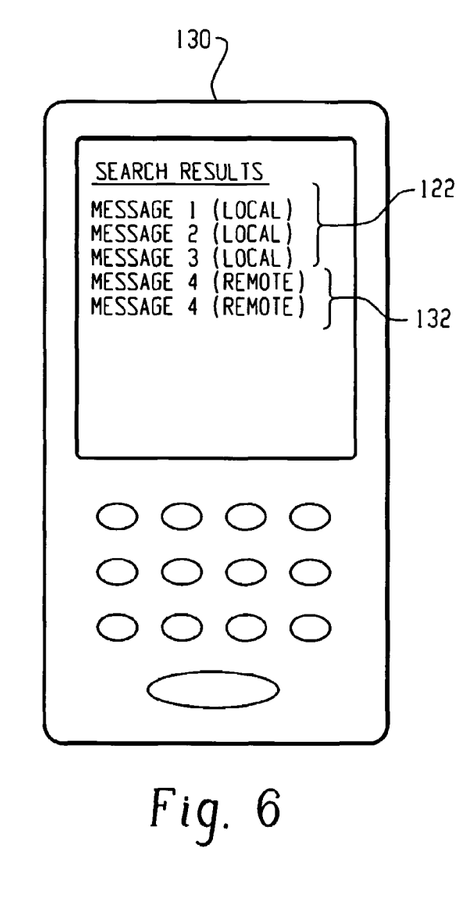
FIG. 6 shows an example user interface for displaying the results of a remote database search.
Figure 7:
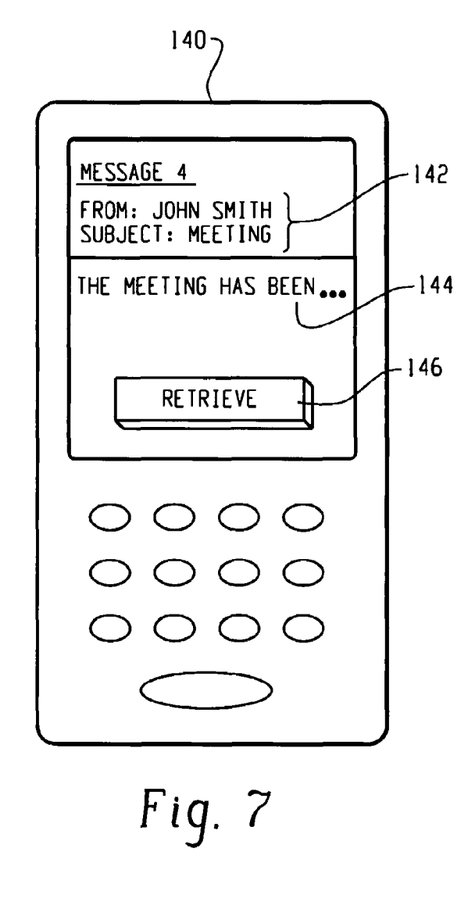
FIG. 7 shows an example user interface for displaying an identifying portion of a remotely stored data item.

At step 108, a search for the data item is performed at the remote application database, as described above. If one or more data items are located in the remote application database that match the search parameters, then a list of the remotely stored data items is displayed on the mobile device at step 110. FIG. 6 shows an example user interface 130 for displaying the results of a remote database search. In this example, the results of the remote database search 132 are listed along with the results 122 of the local database search. If one of the listed data items 132 from the remote search are selected by a user, then identifying information 142 and a representative portion 144 of the selected data item may be displayed, as illustrated in FIG. 7. In the example of FIG. 7, the sender and subject fields 142 of an electronic message are displayed along with a portion (e.g., the first line) of the message body 144. If the user would like to view the entire data item, then an input mechanism, such as a graphical icon 146, may be used to request the data item from the remote server.

Referring again to FIG. 4, at step 110 the list of data items identified from the remote application database is stored in a memory location on the mobile device, such as the local application database. In this manner, remotely stored data items may be identified in a subsequent search of the local application database. Preferably, memory management software on the mobile device may give lesser priority to locally stored lists of data items available in the remote application database. Thus, if additional memory is needed on the mobile device, then remotely available data items may be deleted before the locally stored data items. In addition, the least accessed of the remotely available data items may be given lesser memory management priority than remotely available data items that have been accessed more often or more recently.

A complete copy of a remotely stored data item may be requested at decision step 114. For instance, a device user may request a remote data item by selecting a graphical icon 146 or other input mechanism from a user interface, as shown in FIG. 7. If the remotely stored data item is requested, then a complete copy of the data item is retrieved from the remote application database and displayed on the mobile device at step 116. Otherwise, if the remotely stored data item is not requested, then the method ends at step 118.

Figure 8:
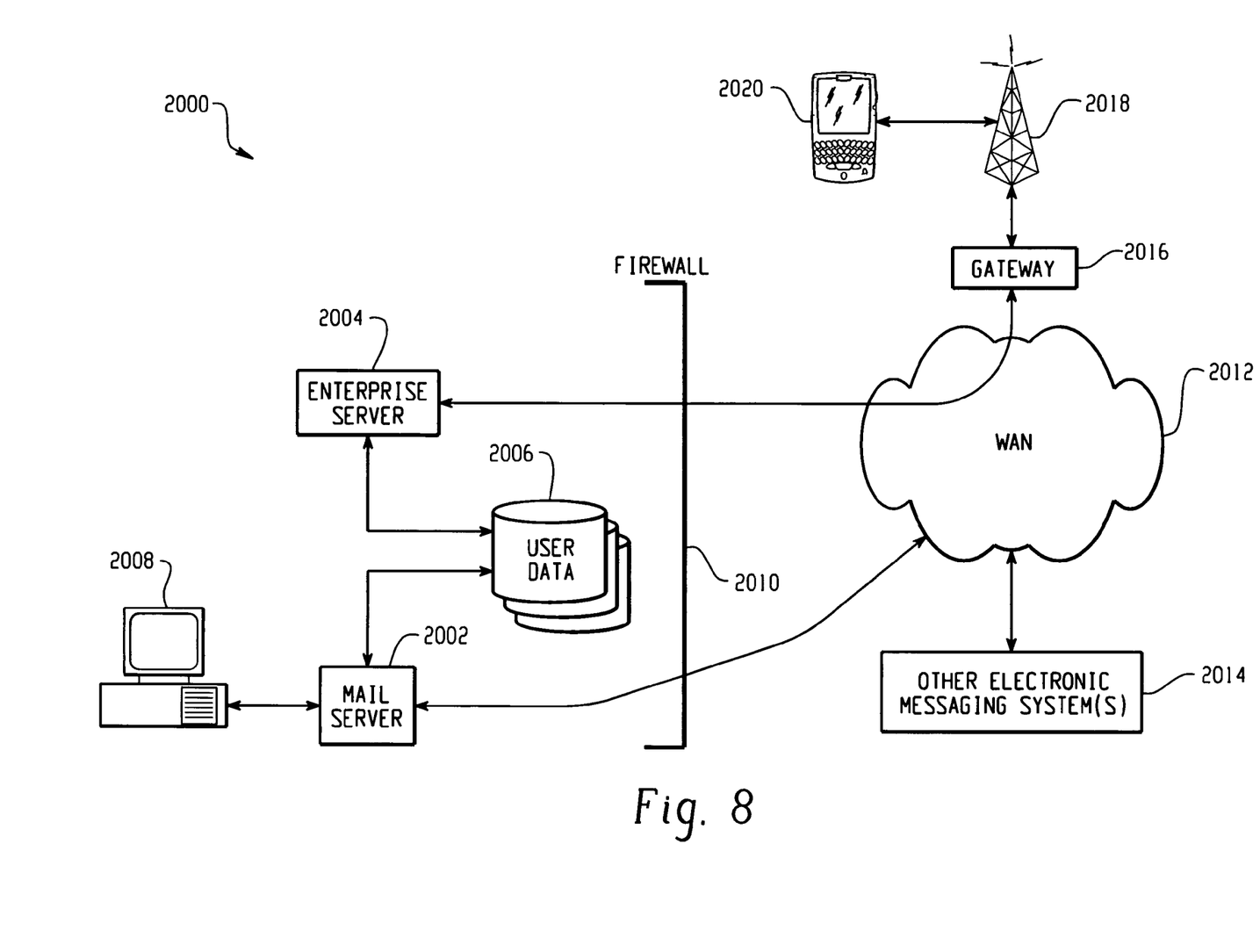
FIG. 8 is a block diagram of an example system for redirecting electronic messages to and from a mobile communication device.

FIG. 8 is a block diagram of an example system 2000 for redirecting electronic messages to and from a mobile communication device 2020. The illustrated system 2000 may, for example, utilize the system and method for searching a remote database, as described above. The example redirection system 2000 includes an enterprise server 2004, a mail server 2002, a storage medium 2006 for electronic messaging (e.g., e-mail) account data, and a wireless gateway 2016. Also illustrated are the mobile communication device 2020, a wireless network 2018, a wide area network (WAN) 2012, a firewall 2010, a desktop client 2008, and one or more other electronic messaging systems 2014.

The mail server 2002 may include electronic messaging software executing on a computer within a local area computer network (LAN). The mail server 2002 is coupled to local network devices 2004, 2006, 2008 via the LAN, and is coupled to remote network devices 2014, 2016 via the WAN 2012. The LAN and WAN 2012 may be separated by a firewall 2010.

The mail server 2002 maintains an electronic message account within the electronic message account database 2006 for each desktop client 2008 in the LAN. The electronic message account database 2006 may be one or more storage devices coupled to the mail server 2002, and may be included within the same network device as the mail server 2002 or in one or more separate devices within the LAN. The desktop client 2008 may be one of a plurality of computers (e.g., personal computers, terminals, laptop computers, or other processing devices) coupled to the mail server 2002 via the LAN that execute electronic messaging software to send and receive electronic messages via the mail server.

Electronic messages sent from the desktop client 2008 are stored by the mail server 2002 in an outgoing message storage location (an "outbox") within a corresponding electronic message account 2006. If the outgoing message is addressed to an electronic message account within the LAN, then the mail server 2002 delivers the message to an incoming message storage location (an "inbox") in the appropriate electronic message account 2006. If the outgoing message is addressed to an electronic message account in another electronic messaging system 2014, however, then the message is delivered via the WAN 2012. Similarly, incoming electronic message addressed to the electronic message account 2006 is received by the mail server 2002 and stored to the electronic message account database 2006 within the appropriate incoming message storage location ("inbox"). The incoming electronic message may then be retrieved from the electronic message account 2006 by the desktop client 2008, or may be automatically pushed to the desktop client 2008 by the mail server 2002.

The enterprise server 2004 may include electronic message redirection software executing on a computer within the LAN. The enterprise server 2004 is operational to redirect electronic messages from the electronic message account 2006 to the mobile communication device 2020 and to place messages sent from the mobile communication device 2020 into the electronic message account 2006 for delivery by the mail server 2002. The enterprise server 2004 stores mobile device information, such as a wireless identification (e.g., a PIN), used to communicate with the mobile communication device 2020. The enterprise server 2004 may, for example, communicate with the mobile communication device 2020 using a direct TCP/IP level connection with the wireless gateway 2016, which provides an interface between the WAN 2012 and the wireless network 2018.

When an electronic message is received in the inbox of the electronic message account 2006, the electronic message is detected by the enterprise server 2004, and a copy of the message and any necessary mobile device information are sent over the WAN 2012 to the wireless gateway 2016. For example, the enterprise server 2004 may encapsulate a copy of the message into one or more data packets along with a wireless identification (e.g., a PIN) for the mobile communication device 2020, and transmit the data packet(s) to the wireless gateway 2016 over a direct TCP/IP level connection. The wireless gateway 2016 may then use the wireless identification and/or other mobile device information to transmit the data packets(s) containing the electronic message over the wireless network 2018 to the mobile communication device 2020.

Electronic messages sent from the mobile communication device 2020 may be encapsulated into one or more data packets along with a network identification for the enterprise server 2004 and then transmitted over the wireless network 2018 to the wireless gateway 2016. The wireless gateway 2016 may use the network identification for the enterprise server 2004 to forward the data packet(s) over the WAN 2012 to the enterprise server 2004, preferably via a direct TCP/IP level connection. Upon receiving the data packet(s) from the wireless gateway 2016, the enterprise server 2004 places the enclosed electronic message into the outbox of the associated electronic message account 2006. The mail server 2002 then detects the electronic message in the outbox and delivers the message, as described above.

Security may be maintained outside of the firewall 2010 by encrypting all electronic messages sent between the enterprise server 2004 and the mobile communication device 2020. For instance, an electronic message to be redirected to the mobile communication device 2020 may be encrypted and compressed by the enterprise server 2004, and the encrypted message may then be encapsulated into one or more data packets for delivery to the mobile communication device 2020. To maintain security, the electronic message may remain encrypted over the entire communication path 2016, 2018, 2012 from the enterprise server 2004 to the mobile communication device 2020. Similarly, electronic messages sent from the mobile communication device 2020 may be encrypted and compressed by the mobile communication device 2020 before being packetized and transmitted to the enterprise server 2004, and may remain encrypted over the entire communication path 2016, 2018, 2012 from the mobile communication device 2020 to the enterprise server 2004.

In addition, the enterprise server 2004 may include a communication subsystem, a memory subsystem and a processing subsystem. The communication subsystem may be operable to communicate with the wireless gateway 2016 over the WAN 2012. The memory subsystem may be operable to store data and program information. The processing subsystem may be operable to store and retrieve data in the memory subsystem and execute programs stored in the memory subsystem, and to cause the communication subsystem to transmit and receive information over the WAN 2012.

Figure 9:
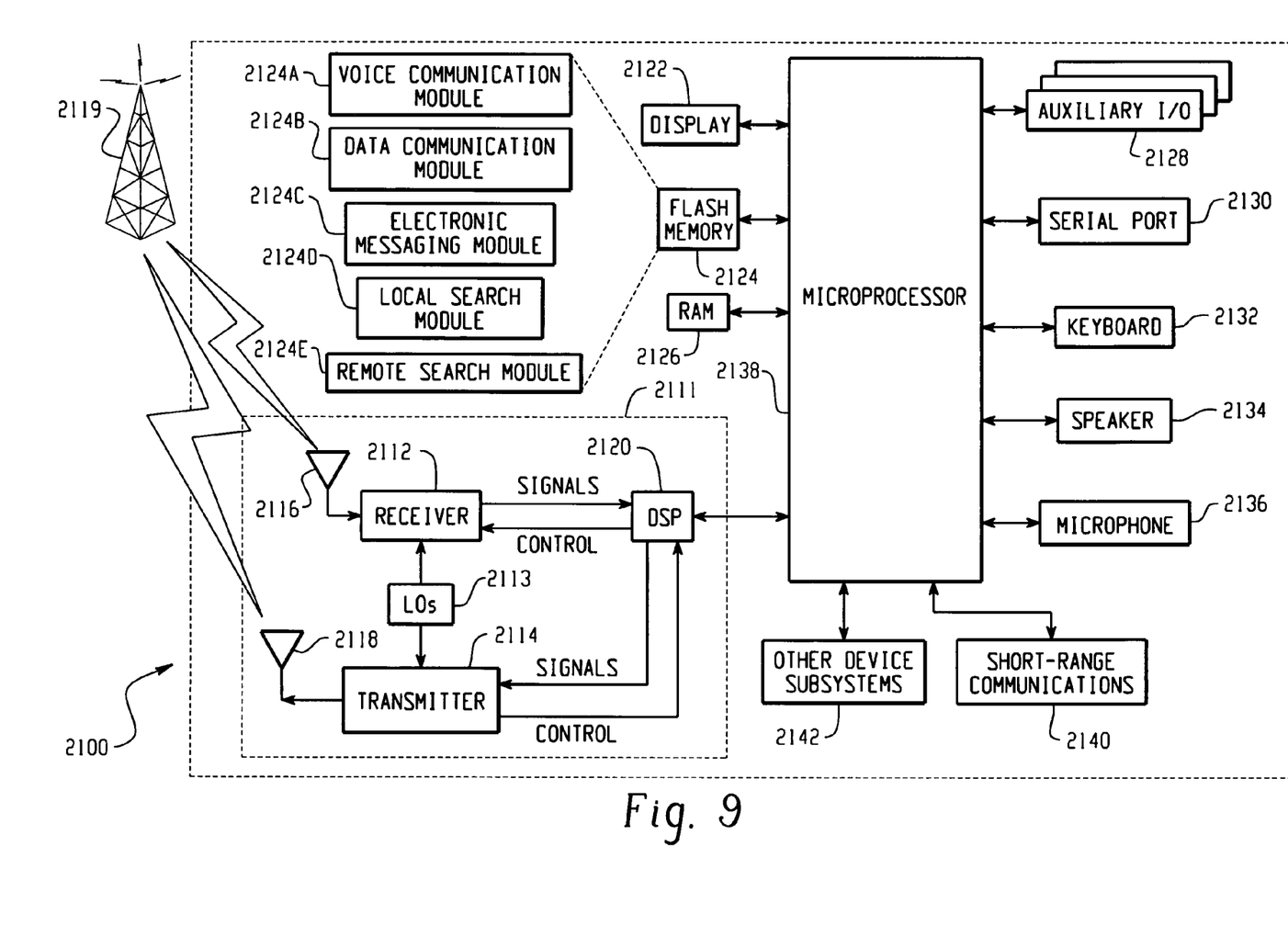
FIG. 9 is a block diagram illustrating an example mobile communication device.

FIG. 9 is a block diagram illustrating an example mobile communication device 2100. The mobile device 2100 includes a processing subsystem 2138, a communications subsystem 2111, a short-range communications subsystem 2140, a memory subsystem 2124, 2126, and various other device subsystems and/or software modules 2142. The mobile device 2100 also includes a user interface, which may include a display 2122, a serial port 2130, keyboard 2132, a speaker 2134, a microphone 2136, one or more auxiliary input/output devices 2128, and/or other user interface devices.

The processing subsystem 2138 controls the overall operation of the mobile device 2100. Operating system software executed by the processing subsystem 2138 may be stored in a persistent store, such as a flash memory 2124, but may also be stored in other types of memory devices in the memory subsystem, such as a read only memory (ROM) or similar storage element. In addition, system software, specific device applications, or parts thereof, may be temporarily loaded into a volatile store, such as a random access memory (RAM) 2126. Communication signals received by the mobile device 2100 may also be stored to RAM 2126.

The processing subsystem 2138, in addition to its operating system functions, enables execution of software applications 2124 on the device 2100. A predetermined set of applications that control basic device operations, such as data and voice communications, may be installed on the device 2100 during manufacture. A personal information manager (PIM) application, including an electronic messaging application, may be installed on the device. The PIM may, for example, be operable to organize and manage data items, such as e-mail, calendar events, voice mails, appointments, and task items. The PIM application may also be operable to send and receive data items via the wireless network 2119. In addition, a local search module 2124D and a remote search module 2124E, as described above, may be installed.

Communication functions, including data and voice communications, are performed through the communication subsystem 2111, and possibly through the short-range communications subsystem 2140. The communication subsystem 2111 includes a receiver 2112, a transmitter 2114 and one or more antennas 2116, 2118. In addition, the communication subsystem 2111 also includes a processing module, such as a digital signal processor (DSP) 2120 or other processing device(s), and local oscillators (LOs) 2113. The specific design and implementation of the communication subsystem 2111 is dependent upon the communication network in which the mobile device 2100 is intended to operate. For example, a mobile device 2100 may include a communication subsystem 2111 designed to operate within the Mobitex™ mobile communication system, the DataTAC™ mobile communication system, a GSM network, a GPRS network, a UMTS network, and/or an EDGE network.

Network access requirements vary depending upon the type of communication system. For example, in the Mobitex and DataTAC networks, mobile devices are registered on the network using a unique personal identification number or PIN associated with each device. In UMTS and GSM/GPRS networks, however, network access is associated with a subscriber or user of a device. A GPRS device therefore requires a subscriber identity module, commonly referred to as a SIM card, in order to operate on a GSM/GPRS network.

When required network registration or activation procedures have been completed, the mobile device 2100 may send and receive communication signals over the communication network 2119. Signals received by the antenna 2116 from the communication network 2119 are routed to the receiver 2112, which provides signal amplification, frequency down conversion, filtering, channel selection, etc., and may also provide analog to digital conversion. Analog-to-digital conversion of the received signal allows the DSP to perform more complex communication functions, such as demodulation and decoding. In a similar manner, signals to be transmitted to the network 2119 are processed (e.g., modulated and encoded) by the DSP 2120 and are then provided to the transmitter 2114 for digital to analog conversion, frequency up conversion, filtering, amplification and transmission to the communication network 2119 (or networks) via the antenna 2118.

In addition to processing communication signals, the DSP 2120 provides for receiver 2112 and transmitter 2114 control. For example, gains applied to communication signals in the receiver 2112 and transmitter 2114 may be adaptively controlled through automatic gain control algorithms implemented in the DSP 2120.

In a data communication mode, a received signal, such as a text message or web page download, is processed by the communication subsystem 2111 and input to the processing device 2138. The received signal is then further processed by the processing device 2138 for output to a display 2122, or alternatively to some other auxiliary I/O device 2128. A device user may also compose data items, such as e-mail messages, using a keyboard 2138 and/or some other auxiliary I/O device 2128, such as a touchpad, a rocker switch, a thumb-wheel, or some other type of input device. The composed data items may then be transmitted over the communication network 2119 via the communication subsystem 2111.

In a voice communication mode, overall operation of the device is substantially similar to the data communication mode, except that received signals are output to a speaker 2134, and signals for transmission are generated by a microphone 2136. Alternative voice or audio I/O subsystems, such as a voice message recording subsystem, may also be implemented on the device 2100. In addition, the display 2122 may also be utilized in voice communication mode, for example, to display the identity of a calling party, the duration of a voice call, or other voice call related information.

The short-range communications subsystem 2140 enables communication between the mobile device 2100 and other proximate systems or devices, which need not necessarily be similar devices. For example, the short-range communications subsystem 2140 may include an infrared device and associated circuits and components, or a Bluetooth™ communication module to provide for communication with similarly-enabled systems and devices.

This written description uses examples to disclose the invention, including the best mode, and also to enable a person skilled in the art to make and use the invention. The patentable scope of the invention may include other examples that occur to those skilled in the art.

It is claimed:

1. In a system having a server that is operable to communicate with a mobile device over a wireless network, the server including a server application database for storing copies of data items that are transmitted to the mobile device and the mobile device including a memory subsystem for storing data items on the mobile device, a memory management method comprising:

determining that additional memory space is needed on the mobile device;

if additional memory space is needed, then communicating with the server over the wireless network to determine if a copy of one or more data items are stored in the server application database, and if copies of the one or more data items are stored in the server application database, then deleting the one or more data items from the memory subsystem in the mobile device to create additional memory space, whereby the mobile device verifies that copies of one or more data items are stored in the server application database before the one or more data items are deleted from the memory subsystem to create additional memory space on the mobile device;

wherein a list of one or more data items identified in the server application database is received from the server application database in order to determine if copies of the one or more data items are stored in the server application database, and wherein data items included in the list are deleted before data items that are not included in the list.

2. The method of claim 1, further comprising:

deleting all data items from the mobile device that have copies stored in the server application database before deleting any data items from the mobile device that do not have copies stored in the server application database.

3. In a system having a server that is operable to communicate with a mobile device over a wireless network, the server including a server application database for storing copies of data items that are transmitted to the mobile device and the mobile device including a memory subsystem for storing data items on the mobile device, the mobile device comprising:

a local application database for storing data items for one or more software applications;

a communication subsystem configured to transmit and receive data over the wireless network;

a memory management system configured to determine that additional memory space is needed in the local application database, and in response cause the communication subsystem to communicate with the server over the wireless network to determine if a copy of one or more data items are stored in the server application database, the memory management system being further configured to delete the one or more data items from the local application database if copies of the one or more data items are stored in the server application database;

whereby the memory management system verifies that copies of one or more data items are stored in the server application database before the one or more data items are deleted from the local application database to create additional memory space;

wherein a list of one or more data items identified in the server application database is received from the server application database in order to determine if copies of the one or more data items are stored in the server application database, and wherein data items included in the list are deleted before data items that are not included in the list.

4. The mobile device of claim 3, wherein the memory management system is configured to delete all data items from the local application database that have copies stored in the server application database before deleting any data items from the mobile device that do not have copies stored in the server application database.

5. The mobile device of claim 3, further comprising:

a display;

a local search module that causes the mobile device to identify one or more data items stored in the local application database that match one or more parameters, a list of the one or more data items being displayed on the display along with an input field to enable a user to instruct the mobile device to execute a remote search operation; and a remote search module that causes the mobile device to transmit a remote search request to the server in response to the user instructions to execute the remote search operation, the remote search request including the one or more parameters, which are used by the server to identify one or more data items stored in the server application database matching the one or more parameters.

6. The mobile device of claim 5, wherein the mobile device receives the one or more data items identified from the server application database and displays a list of the one or more data items from the server application database on the display.

7. The mobile device of claim 3, wherein the one or more software applications include an electronic messaging application, the local application database includes an electronic mailbox for storing electronic messages, and the sever-based application database includes a corresponding electronic mailbox for storing a copy of the electronic messages received by the mobile devices.

8. The mobile device of claim 7, wherein the server includes an electronic mail server configured to send and receive electronic messages over one or more computer networks and store received electronic messages in the corresponding electronic mailbox.

9. The mobile device of claim 8, wherein the server further includes an enterprise server for forwarding a copy of received electronic messages to the mobile device.

10. The mobile device of claim 8, wherein the electronic mailbox in the local application database is synchronized with the corresponding electronic mailbox in the server-based application database.

11. In a system having a server that is configured to communicate with a mobile device over a wireless network, the server including a server application database for storing copies of data items that are transmitted to the mobile device, the mobile device, comprising:

a local application database for storing data times for one or more software applications;

a communication subsystem configured to transmit and receive data over the wireless network; a remote search module configured to transmit a search request to the server, the search request including one or more search parameters that are used by the server to identify one or more copies of data items that are stored in the server application database;

the remote search module further configured to receive a search result from the server that identifies the one or more copies of data items and being further configured to include the one or more copies of data items in a list of data items identified in the server application database; and a memory management system configured to determine that additional memory space is needed in the local application database, and in response identify one or more data items for deletion from the local application database;

the memory management system identifying the one or more data items for deletion by accessing the list of data items identified in the server application database and deleting data items included in the list before deleting data items that are not included in the list;

whereby the memory management system verifies that copies of the one or more data items are stored in the server application database before the one or more data items are deleted from the local application database to create additional memory space.

* * * * *